United States Patent [19]
Toguchi et al.

[11] Patent Number: 5,831,084
[45] Date of Patent: Nov. 3, 1998

[54] OXYTITANIUM PHTHALOCYANINE CRYSTAL

[75] Inventors: Satoru Toguchi; Akira Hirano, both of Tokyo, Japan

[73] Assignee: NEC Corporation, Tokyo, Japan

[21] Appl. No.: 864,976

[22] Filed: May 28, 1997

[30] Foreign Application Priority Data

May 29, 1996 [JP] Japan ................................... 8-135430

[51] Int. Cl.$^6$ ................................... C09B 67/50
[52] U.S. Cl. ............................. 540/141; 430/78
[58] Field of Search .................... 540/141, 143; 430/76, 78, 135

[56] References Cited

U.S. PATENT DOCUMENTS 4,664,997  5/1987  Suzuki et al. ............................. 430/78
5,132,197  7/1992  Iuchi et al. ................................ 430/78
5,432,278  7/1995  Yamazaki et al. ...................... 540/141

FOREIGN PATENT DOCUMENTS 4-211460  8/1992  Japan .
5-72773   3/1993  Japan .

*Primary Examiner*—John Goodrow
*Attorney, Agent, or Firm*—Sughrue, Mion, Zinn, Macpeak & Seas, PLLC

[57] ABSTRACT

A photoreceptor for electrophotography comprises a photosensitive layer containing an effective amount of oxytitanium phthalocyanine crystal having strong peaks at 9.6°, 24.2° and 27.3° and weak and broad peaks at approximately 11.6°, 13.5°, 14.3° and 18.1° in Bragg angle $2\theta \pm 0.2°$ by CuKα characteristic X-ray diffraction, and an exothermic peak at 266° C. in differential scanning calorimetry. The oxytitanium phthalocyanine crystal has a small grain size and a high stability and the photoreceptor has a high photosensitivity to light having a long wavelength.

7 Claims, 9 Drawing Sheets

OXYTITANIUM PHTHALOCYANINE CRYSTAL

BACKGROUND OF THE INVENTION (a) Field of the Invention

The present invention relates a oxytitanium phthalocyanine crystal and, more particularly, to a oxytitanium phthalocyanine crystal suitable for use in a photoreceptor for electrophotography.

(b) Description of the Related Art

Phthalocyanine has large thermal and chemical stability and is relatively easily synthesized so that it is used in a wide variety of fields such as coloring pigments for paint, ink and resin, as well as catalysts, photoreceptors for electrophotography, solar batteries, sensors etc.

A printer using an electrophotographic technique remarkably developed recently. It generally employs a semiconductor laser as a light source. Photoreceptors having sufficient sensitivity to the wavelengths of semiconductor lasers currently used, around 790 nm, are actively developed.

The sensitivity of the photoreceptor for electrophotography depends on the charge-generation materials in the photoreceptor. The photoreceptor containing phthalocyanine charge-generation material often have an excellent sensitivities to those wavelengths.

Phthalocyanines have a large variety of crystal structures depending on small differences in the condition of the fabrication process and have large differences in the photosensitivity depending on the crystal structures.

Especially, in oxytitanium phthalocyanine which exhibits an excellent photosensitivity to light having wavelength around 790 nm, it is known that several different crystal structures exist and they have difference in photosensitivity depending on the crystal structure. Since most of the oxytitanium phthalocyanine crystals used in a photoreceptor for electrophotography have metastable structures, the crystal structure transformations into the most stable structure by a thermal energy or mechanical shear force etc. are often occurred thereto, thereby exhibiting an unstable photosensitivity as a photoreceptor.

When phthalocyanine is used in a variety of applications, especially, in the photoreceptor for electrophotography, it is most likely that the phthalocyanine is used as a thin film. The thin film made of phthalocyanine is generally formed by vacuum deposition method or by coating method. In the case of coating method, phthalocyanine amine is used with binder resin. The coating of the dispersed phthalocyanine is preferred and widely used due to the simple process and a low cost. However, the dispersed-phthalocyanine film is inferior to the vacuum deposited phthalocyanine film in uniformity of the film due to its structure. To improve the uniformity in the film, it is important to reduce the grain size and to narrow the grain size distribution of phthalocyanine pigment as well as to improve the dispersiveness of a phthalocyanine pigment. Decreasing the grain size of phthalocyanine pigment and narrowing the distribution are usually achieved by a dry milling, wet milling or acid pasting method. The acid pasting method is described in, for example, Patent Publication No. JP-A-5 (1993)-72773 which proposes an improved acid pasting method. In this patent publication, phthalocyanine and a phthalocyanine derivative having electron-withdrawing group are admixed to an organic acid and precipitated by water or a bad solvent to obtain a phthalocyanine composite having small grain size and a narrow distribution thereof.

In a conventional method as described above, however, it is difficult to obtain both a small grain size and a useful crystal structure of the phthalocyanine pigment as the photoreceptor. Another Patent Publication No. JP-A-4 (1992)-211460 describes that a water paste of oxytitanium phthalocyanine and an ether compound are mixed with dispersing material such as glass beads and steel beads and dispersed by a milling device such as a ball mill, to thereby obtain oxytitanium phthalocyanine crystal wherein Bragg angle $2\theta \pm 0.2°$ measured by a CuK$\alpha$ characteristic X-ray diffraction has strong peaks at 9.0°, 14.2°, 23.9°, and 27.1°. In this method, however, there are loss of product in the takeout process and impurities generated by pulverization of the beads are contaminated in product.

It is an object of the present invention to provide oxytitanium phthalocyanine crystal having a small grain size, a high stability and a high photosensitivity as charge generation material in photoreceptor. The present invention also provides a method for manufacturing the same and a photoreceptor made therefrom.

SUMMARY OF THE INVENTION

Present inventors have conducted various experiments and tests for achieving a oxytitanium phthalocyanine crystal having a small grain size, a high stability and a high photosensitivity, and have found that such a crystal was easily obtained by introducing non-crystal grains of oxytitanium phthalocyanine into a triether organic solvent, followed by stirring thereof.

The oxytitanium phthalocyanine crystal thus manufactured exhibited, in measurement of Bragg angle $2\theta \pm 0.2°$ by CuK$\alpha$ characteristic X-ray diffraction, strong peaks at approximately 9.6°, 24.2° and 27.3° and weak and broad peaks at approximately 11.6°, 13.5°, 14.3° and 18.1°. The oxytitanium phthalocyanine crystal can be obtained by stirring non-crystal grains of oxytitanium phthalocyanine in triether organic solvent.

The present invention also provides a photoreceptor which incorporates the oxytitanium phthalocyanine crystal as described above in a coating layer overlying an electric conductive substrate.

The above and other objects, features and advantages of the present invention will be more apparent from the following description, referring to the accompanying drawings.

PREFERRED EMBODIMENTS OF THE INVENTION

Now, the present invention will be more specifically described based on preferred embodiments thereof with reference to the accompanying drawings, wherein similar constituent elements are designated by the same or similar reference numerals.

The oxytitanium phthalocyanine crystal according to the present invention has a chemical structure as follows:

The oxytitanium phthalocyanine having the structure as recited above can be easily prepared by known methods. For example, the method may be as follows, but not limited thereto in manufacture of the oxytitanium phthalocyanine crystal according to the present invention. First, titanium tetrachloride is reacted with orthophthalodinitrile in an organic solvent to prepare dichlorotitanium phthalocyanine. Preferable organic solvents for this purpose include an organic solvent having a high boiling point and inactive to reaction, such as nitrobenzene, quinoline, α-chloronaphthalene, β-chloronaphthalene, α-methylnaphthalene, methoxynaphthalene, diphenylmethane, diphenylethane, ethyleneglycoldialkylether, diethyleneglycoldialkylether, triethyleneglycoldialkylether etc. Reaction proceeds, preferably at 150° C. to 300° C., and more preferably at 200° C. to 250° C.

The coarse oxytitanium phthalocyanine thus prepared is washed with a solvent, such as α-chloronaphthalene, trichlorobenzene, dichlorobenzene, N-methylpyrrolidone, and N,N-dimethylformamide. Then, it is washed with a solvent such as methanol or ethanol and hydrogenated by hot water to prepare blue oxytitanium phthalocyanine.

The non-crystal grains of oxytitanium phthalocyanine as used in the present invention are prepared by acid-pasting, dry milling, or wet milling of oxytitanium phthalocyanine, but not limited thereto. The non-crystal grains may be in any form such as a dried state or in the form of water paste.

Examples for the triether organic solvent as used in the present invention are diethyleneglycoldimethylether, diethyleneglycoldiethylether, diethyleneglycoldibutylether, dipropyleneglycoldimethylether, dipropyreneglycoldiethylether, 2,5-dimethoxytetrahydrofuran, 2,5-diethoxytetrahydrofuran, 2,5-dimethoxy-2,5-dihydrotetrahydrofuran, and 2,5-diethoxy-2,5-dihydrotetrahydrofuran, but not limited thereto. The triether organic solvent as used herein should have three ether bonds in a molecule, and can be used alone or in combination of two or more of them. Moreover, mixture of these solvents and water may also be used.

Figure 1:
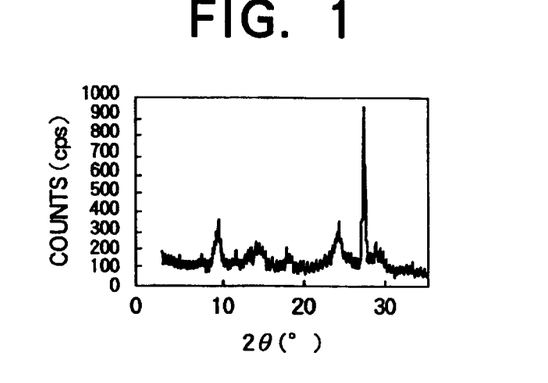
FIG. 1 is a typical X-ray diffraction pattern of T-1000 oxytitanium phthalocyanine crystal.

The oxytitanium phthalocyanine crystal has, in a Bragg angle $2\theta \pm 0.2°$ by CuKα characteristic X-ray diffraction, strong peaks at 9.6°, 24.2° and 27.3° and weak and broad peaks at 11.6°, 13.5°, 14.3° and 18.1° and referred to as T-1000 type. The oxytitanium phthalocyanine crystal can be obtained by stirring non-crystal fine grains of oxytitanium phthalocyanine described above in a beaker in the presence of a triether solvent by using a stirrer such as a stirring paddle, stirring screw and a stirring motor. X-ray diffraction pattern of the oxytitanium phthalocyanine crystal is shown in FIG. 1.

The weight ratio of the triether organic solvent and oxytitanium phthalocyanine may be arbitrary, and is preferably between 10:1 and 200:1. Smaller amount of solvent increases the viscosity of the dispersed system to be treated so that a uniform treatment is difficult. On the other hand, a larger amount of solvent reduces the amount of oxytitanium phthalocyanine treated in a volume to thereby reduce productivity.

The oxytitanium phthalocyanine crystal thus obtained is superior in the photo-conductivity so that it can be suitably used in a photoreceptor for electrophotography, solar battery, sensor and switching device.

The following description is mainly given to an exemplified case in which the oxytitanium phthalocyanine crystal is used as a charge-generation material in a photoreceptor.

The photoreceptor for electrophotography according to a preferred embodiment of the present invention is manufactured by consecutively laminating a blocking layer, a charge-generation layer and a charge-transport layer on a conductive substrate. Alternatively, it may be such that the blocking layer, charge-transport layer and charge-generation layer are consecutively laminated on the substrate, or a charge-generation material and a charge-transport material are dispersed in a binder resin which is applied onto the blocking layer. The blocking layer may be omitted if desired. Further, an overcoat layer or protective layer may be formed as a top layer.

By coating the oxytitanium phthalocyanine crystal which is suitable as a charge-generation material according to the present invention onto a substrate together with a binder resin, a resultant charge-generation layer exhibits a high photosensitivity to a longer wavelength and achieves a small residual potential and a small dark decay.

This coating is effected by a spin-coater, applicator, spray-coater, bar-coater, dip-coater, doctor blade, roller-coater, curtain-coater, bead-coater, slide-hopper etc., which are well-known in the art. The drying of the coated layer is preferably effected in a thermally drying process at a temperature between 40° C. and 300° C., more preferably between 60° C. and 200° C., for a time period between two minutes and ten hours, more preferably between ten minutes and six hours, in an ambience of a still air or blow air.

The solvent for dispersion of the oxytitanium phthalocyanine crystal depends on the kind of resin used. And the solvent should not ill-affect the blocking layer as described later in the coating step.

The solvent for dispersion of oxytitanium phthalocyanine crystal may be preferably selected from: triethers such as diethyleneglycoldimethylether, diethyleneglycoldiethylether, diethyleneglycoldibutylether, dipropyleneglycoldimethylether, dipropyreneglycoldiethylether, 2,5-dimethoxytetrahydrofuran, 2,5-diethoxytetrahydrofuran, 2,5-dimethoxy-2,5-dihydrofuran, and 2,5-diethoxy-2,5-dihydrofuran; aromatic hydrocarbons such as benzene, toluene, xylene, ligroine, monochlorobenzene, and dichlorobenzene; ketones such as acetone, methylehtylketone, methylisobutylketone, and cyclohexanone; alcohols such as methanol, ethanol, and isopropanol; esters such as ethyl acetate and methylcellosolve, aliphatic halogenated hydrocarbons such as carbon tetrachloride, chloroform, dichloromethane, dichloroethane, and trichloroethylene; ethers such as tetrahydrofuran, and dioxane; amides such as N,N-dimethylformamide and N,N-dimethylacetoamide; and surfoxide such as dimethylsurfoxide.

The charge generation layer has a thickness preferably between 0.01 $\mu$m and 10 $\mu$m, and more preferably between 0.1 $\mu$m and 3 $\mu$m. Plasticizers, charge-acceptor or charge-donor may be used together with binders if desired.

The charge-transport material used in a charge-transport layer may be selected from inorganic material such as selenium (Se), cadmium sulfide (CdS), zinc oxide (ZnO), amorphous silicon (a-Si), and organic compounds such as diarylalkane derivatives, stilbene compounds, triphenylamine derivatives, hydrazone compounds, but not limited thereto.

Binder resins for obtaining the charge-transport layer in coating process can be selected from a variety of known insulator resins generally used in the art. Or otherwise, the binder resin may be selected from organic photoconductive polymers such as polyvinylcarbazole resin, polyvinyl anthracene resin, and polyvinylpyrene resin. Specifically, the binder resin may be selected from insulator resins such as polyvinyl butyral resin, polyallyrate resin, polycarbonate resin, polyester resin, polyester carbonate resin, phenoxy resin, polyvinyl acetate, acrylic resin, polyacrylamide resin, polyamide resin, polyvinyl pyridine resin, cellulose resin, urethane resin, epoxy resin, silicon resin, polystyrene resin, polyether resin, polythioether resin, polyketone resin, polyvinyl chloride resin, vinyl chloride-vinyl acetate copolymer, polyvinyl acetal resin, polyacrylonitrile resin, phenol resin, melamine resin, casein, polyvinyl alcohol resin, polyvinyl pyrrolidone resin, polysilane, but not limited thereto. The amount of resins contained in the charge-transport layer is preferably between 99% and 0% by weight, more preferably between 70% and 30% by weight. Those resins may be used alone or in combination of two or more of them.

The solvent for the charge-transport material depends on the resins and is preferably selected from the materials which do not ill-affect in the coating step the blocking layer or charge-generation layer.

The solvent may be preferably selected from: aromatic hydrocarbons such as benzene, toluene, xylene, ligroine, monochlorobenzene, and dichlorobenzene; ketones such as acetone, methylethylketone, and cyclohexanone; alcohols such as methanol, ethanol, and isopropanol; esters such as ethyl acetate and methylcellosolve; aliphatic halogenated hydrocarbon such as carbon tetrachloride, chloroform, dichloromethane, dichloroethane, and trichloroethylene; ethers such as tetrahydrofuran and dioxane; amides such as N,N-dimethylformamide and N,N-dimethylacetoamide; and surfoxide such as dimethylsurfoxide, but not limited thereto.

The charge-transport layer in the photoreceptor for electrophotography should have a thickness preferably between 5 $\mu$m and 0 $\mu$m, and more preferably 10 $\mu$m and 30 $\mu$m. UV absorber, antioxidant, electron acceptor, and plasticizer may be added into the charge-transport layer if desired.

The blocking layer may be made of a binder resin or a metallic oxide. Materials for the binder resin in the blocking layer may be any of them generally used in the art. Examples of the materials for the binder resin include alcohol-soluble polyamides such as nylon 6, nylon 66, nylon 11, nylon 610, nylon copolymers, alkoxymethylated nylon; cellulose resin such as casein, polyvinyl alcohol resin, ethyleneacrylic acid copolymer, vinyl chloride-vinyl acetate-maleic acid copolymer, epoxy resin, gelatin, polyurethane resin, polyvinyl butyral resin, nitrocellulose, and carboxymethyl cellulose. These compound may be used alone or in combination of two or more of them. An electron acceptor or electron donor may be added therein if desired. The binder resin is coated similarly to the case of charge-transport layer or charge-generation layer. The blocking layer should have a thickness preferably between 0.01 $\mu$m and 20 $\mu$m, and more preferably between 0.2 $\mu$m and 10 $\mu$m. The metal oxides for the blocking layer may be any of them generally used in the art, such as aluminum or titanium oxide. The form of the metal oxide blocking layer may be a film dispersed in the binder resin or oxide film formed on the surface of a conductive substrate. Further, the blocking layer itself may be omitted.

The photoreceptor for electrophotography according to the present invention can be used not only for a copying machine, printer and facsimile, but also for electrophotographic makeup, photoelectric conversion elements for a solar battery or electroluminescence device and materials for an optical disk.

The photoreceptor for electrophotography according to the present invention may be used in any form such as a plate, cylinder or film as used in a conventional photoreceptor for electrophotography.

Figure 2:
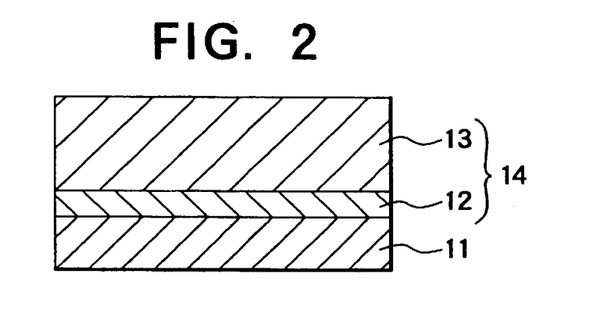
FIGS. 2 to 9 are sectional views each of a photoreceptor according to an embodiment of the present invention.
Figure 3:
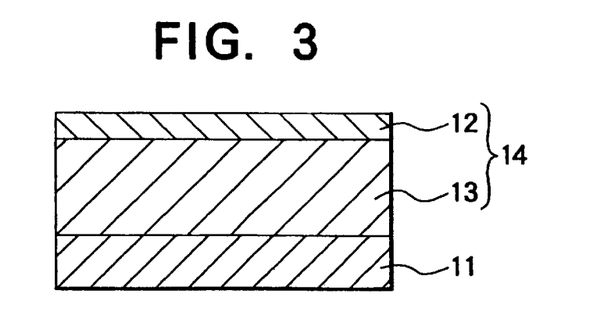

The photoreceptor according to the present invention may be formed in any of the structures shown in FIGS. 2 to 9. Referring to FIGS. 2 and 3, the photoreceptor comprises a electric conductive substrate 11, on which a photoreceptor laminate 14 including a charge-generation layer 12 containing a charge-generation material as a main component and a charge-transport layer 13 containing a charge-transport material as a main component.

Figure 4:
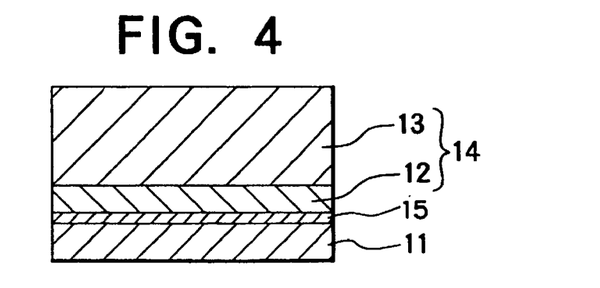
Figure 5:
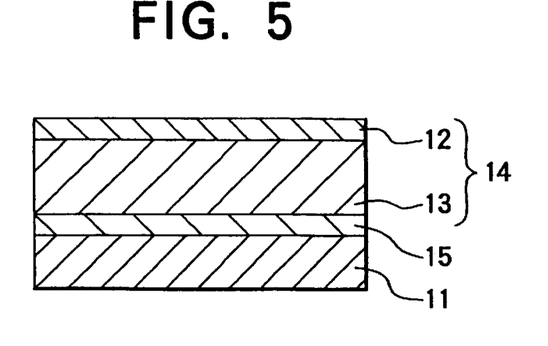

Referring to FIGS. 4 and 5, the photoreceptors shown in these figures are similar to those shown in FIGS. 2 and 3, respectively, except for a blocking layer 15, which is formed on the conductive substrate 11. The two-layer structure of the photoreceptor laminate 14 shown in FIGS. 2 to 5 has an excellent characteristic and is most suited for electrophotography.

Figure 6:
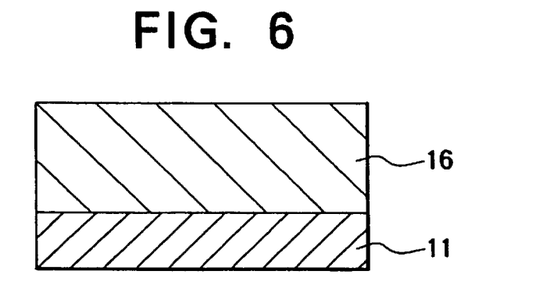
Figure 7:
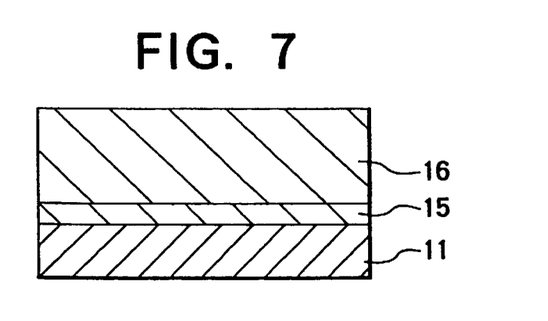
Figure 8:
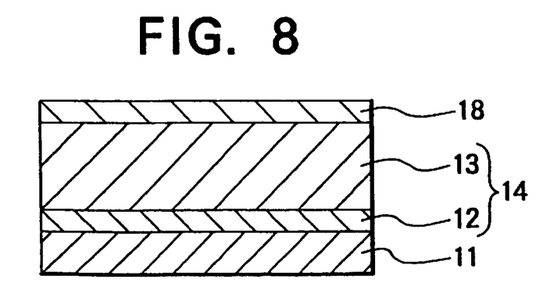
Figure 9:
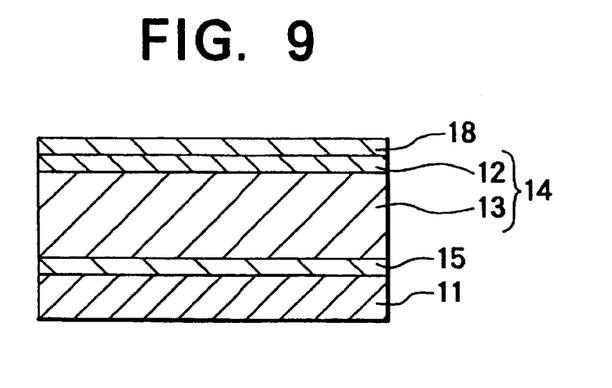

Referring to FIGS. 6 and 7, the photoreceptors shown in these figures are similar to those shown in FIGS. 2 and 4, respectively, except for the single layer structure of the photoreceptor layer 16. The photoreceptor layer 16 contains a charge-transport material as a main component and a charge-generation material dispersed in the single layer 16. The photoreceptors shown in FIGS. 8 and 9 are similar to those shown in FIGS. 2 and 5, respectively, except for a protective layer or overcoat layer 18 formed on the photoreceptor laminate 14.

The oxytitanium phthalocyanine crystal according to the present invention may be used in combination with another charge-generation material if desired.

Samples for the oxytitanium phthalocyanine crystal according to the present invention were manufactured and tested for their characteristics together with comparative Samples as follows.

X-ray diffraction measurements in the tests were effected by using CuKα characteristic X-rays under the following condition.

Device: X-ray diffraction meter "RINT-2100 System" from Rigaku Electric corp.

X-ray tube: Cu

Tube voltage: 40 kV

Tube current: 30 mA

Scanning: 2θ/θ scanning

Scanning speed: 3 deg./min.

Sampling interval: 0.01 deg.

Starting angle (2θ): 3 deg.

Stopping angle (2θ): 35 deg.

The differential thermal analysis of the oxytitanium phthalocyanine crystal was effected under the following condition.

Device: "DSC3100 System" from Mac Science

Starting temperature: 34° C.

Stopping temperature: 350° C.

Ambience: $N_2$

Temperature rise: 20° C./min.

Vessel: Aluminum pan

The SEM observations of the oxytitanium phthalocyanine crystal were effected under the following condition.

Device: "S-4100 System" from Hitachi Ltd.

Acceleration voltage: 20 kV

Magnification: 20000

Figure 10:
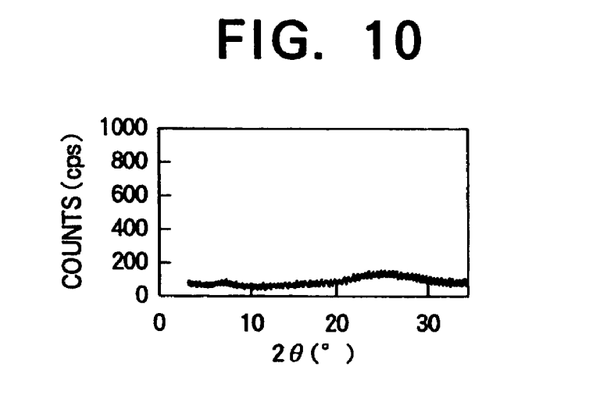
FIG. 10 is an example of an X-ray diffraction pattern of a non-crystal oxytitanium phthalocyanine grains used in the present invention.

Preparation of oxytitanium phthalocyanine 20.4 parts o-phthalodinitrile and 7.6 parts titanium tetrachloride were reacted in 50 parts quinoline at 200° C. for two hours, followed by removal of solvent by steam distillation. The crude products were refined by 2% aqueous hydrochloric acid and subsequently by 2% aqueous sodium hydroxide. They were washed with methanol and N,N-dimethylformamide, and dried. Thus, 21.3 parts oxytitanium phthalocyanine was obtained. 2 parts by weight oxytitanium phthalocyanine thus obtained was slowly added to 60 parts by weight concentrated sulfuric acid maintained below 2° C., while admixing them for dissolution. The sulfuric acid solution thus obtained was so slowly admixed with 2000 parts by weight water maintained below 18° C. that the temperature of the whole liquid was maintained below 20° C. Resultant blue crystal was taken out by filtration and neutralized by washing with water. The results of measurement by CuKα characteristic X-ray diffraction are shown in FIG. 10. The oxytitanium phthalocyanine thus obtained was in an amorphous state, as illustrated in the figure.

Preparation of Oxytitanium Phthalocyanine, (Sample #1)

Figure 11:
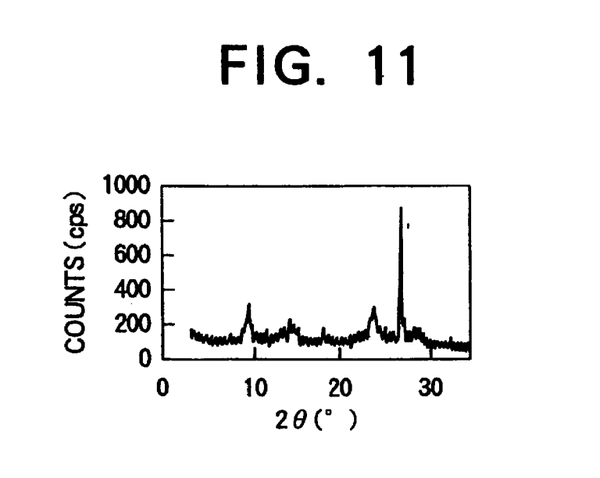
FIG. 11 is another X-ray diffraction pattern of an oxytitanium phthalocyanine crystal manufactured by the process according to a first embodiment of the present invention.
Figure 12:
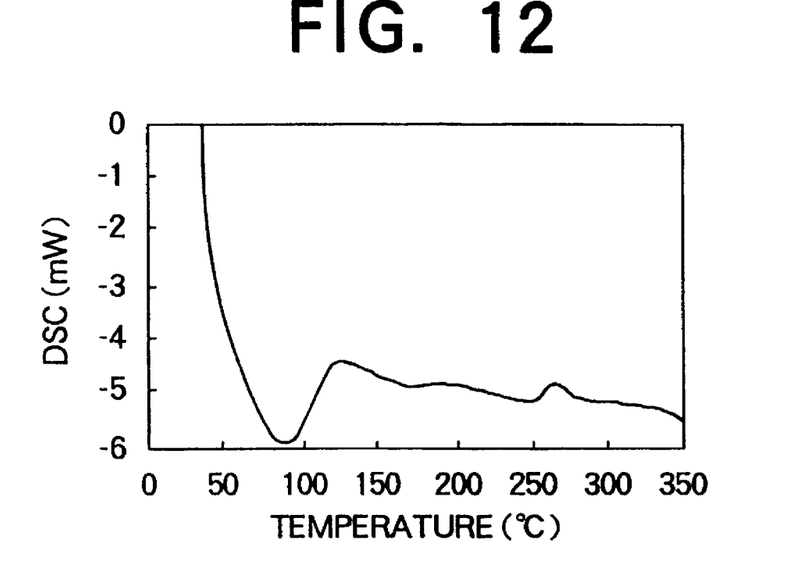
FIG. 12 is a result of differential scanning calorimetry of the oxytitanium phthalocyanine crystal manufactured by the process according to the first embodiment of the present invention.
Figure 13:
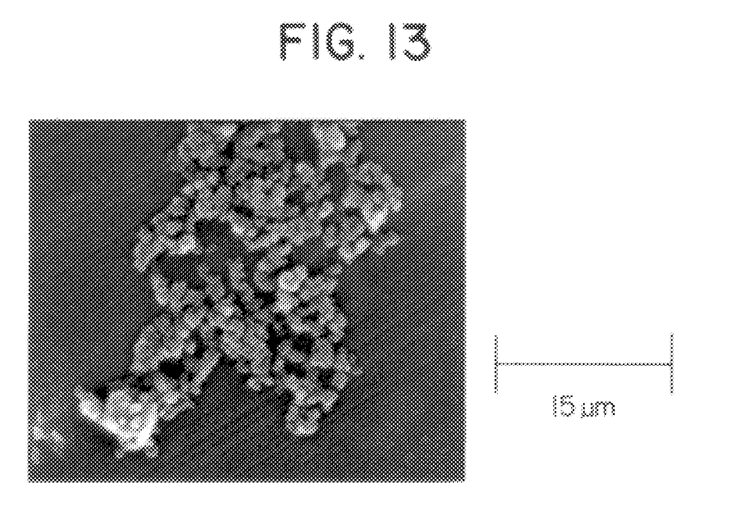
FIG. 13 is a SEM photograph of the oxytitanium phthalocyanine crystal manufacture by the process according to the first embodiment of the present invention.

2 gram of the blue non-crystal oxytitanium phthalocyanine obtained by the above procedure was introduced in a 200 milli-litter (ml) beaker. Diethleneglycoldimethylether was added there and total volume was 200 ml. The resultant liquid was stirred for 24 hours by a plate stirrer, glass stirring rod and three-one motor to obtain oxytitanium phthalocyanine crystal. The oxytitanium phthalocyanine crystal, which was taken out from the beaker as a solid ingredient in the dispersed liquid and dried, exhibited strong peaks at 9.6°, 24.2° and 27.3°, and weak and broad peaks at 11.6°, 13.5°, 14.3° and 18.1° in Bragg angle 2θ±0.2° by CuKα characteristic X-ray diffraction. The differential scanning calorimetry for the oxytitanium phthalocyanine crystal showed an exothermic peak of 1.1 J(joule)/g at around 266° C. due to crystal structure transform. A SEM observation manifested that a maximum grain size of the crystals was 0.4 μm. FIGS. 11, 12 and 13 show the results of the measurements by CuKα characteristic X-ray diffraction, differential scanning calorimetry and SEM photography, respectively, for the oxytitanium phthalocyanine crystal of Sample #1.

Preparation of Oxytitanium Phthalocyanine, (Sample #2)

Figure 14:
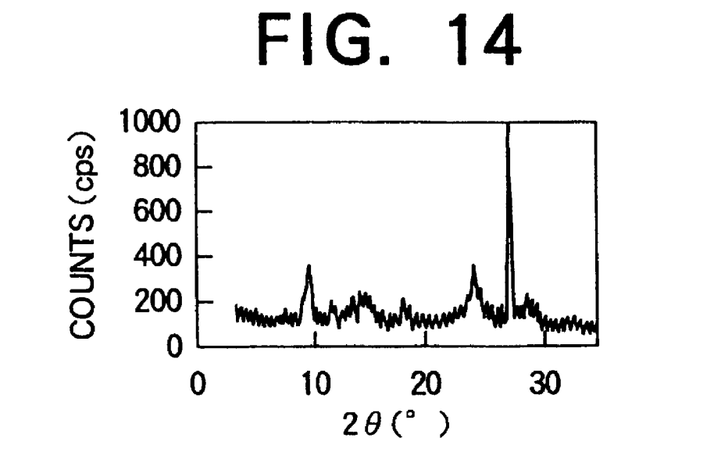
FIG. 14 is an X-ray diffraction pattern of the oxytitanium phthalocyanine crystal manufactured by a process according to a process according to a second embodiment of the present invention.
Figure 15:
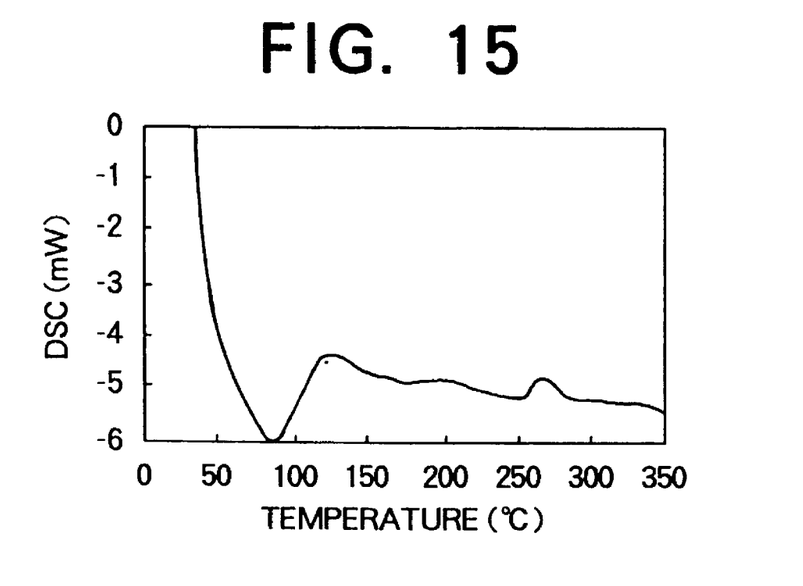
FIG. 15 is a result of differential scanning calorimetry of the oxytitanium phthalocyanine crystal manufactured by the process according to the second embodiment of the present invention.
Figure 16:
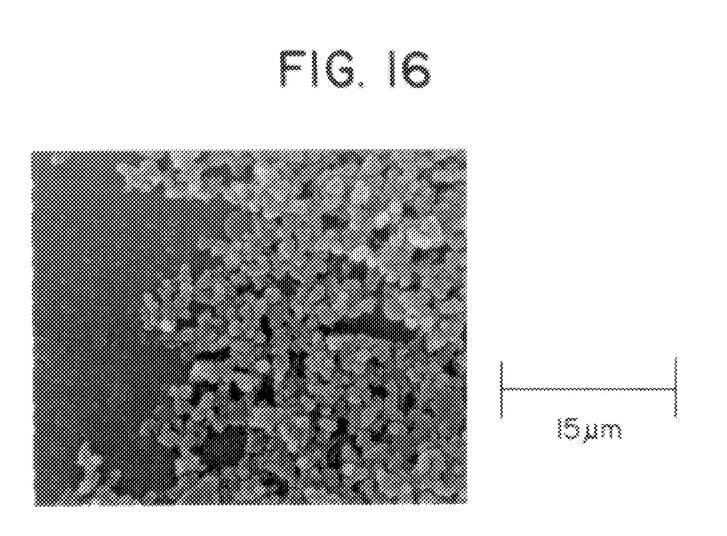
FIG. 16 is a SEM photograph of the oxytitanium phthalocyanine crystal manufactured by the process according to the second embodiment of the present invention.

Another oxytitanium phthalocyanine crystal was obtained similarly to Sample #1 except for the triether solvent used for dispersion, which was dimethoxytetrahydrofuran for Sample #2. The oxytitanium phthalocyanine crystal, which was taken out from the beaker as a solid ingredient in the dispersed liquid and dried, exhibited strong peaks at 9.6°, 24.2° and 27.3° and weak and broad peaks at 11.6°, 13.5°, 14.30° and 18.1°. in Bragg angle 2θ±0.2° by CuKα characteristic X-ray diffraction. The differential scanning calorimetry for the oxytitanium phthalocyanine crystal showed an exothermic peak of 1.1 J(joule) /g at around 266° C. due to crystal structure transform. A SEMICONDUCTOR observation manifested that a maximum grain size of the crystals was 0.4 μm. FIGS. 14, 15 and 16 show the results for the CuKα characteristic X-ray diffraction, differential scanning calorimetry and SEM photography, respectively, for the oxytitanium phthalocyanine crystal of Sample #2.

COMPARATIVE SAMPLE #1

Figure 17:
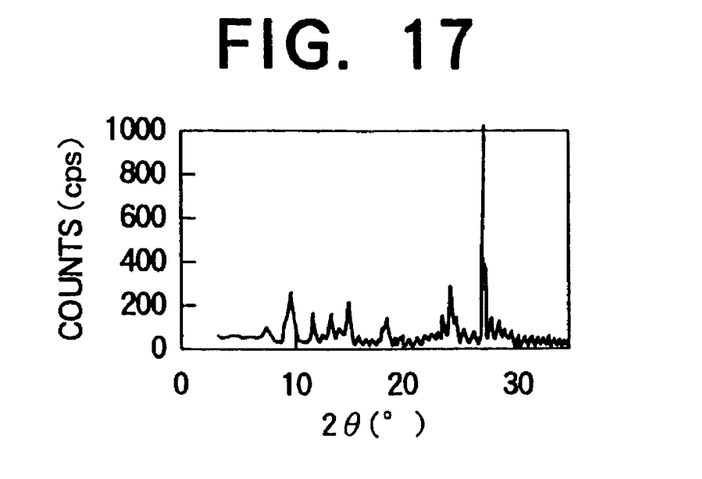
FIG. 17 is an X-ray diffraction pattern of the oxytitanium phthalocyanine crystal manufactured by the process according to a first comparative example.
Figure 18:
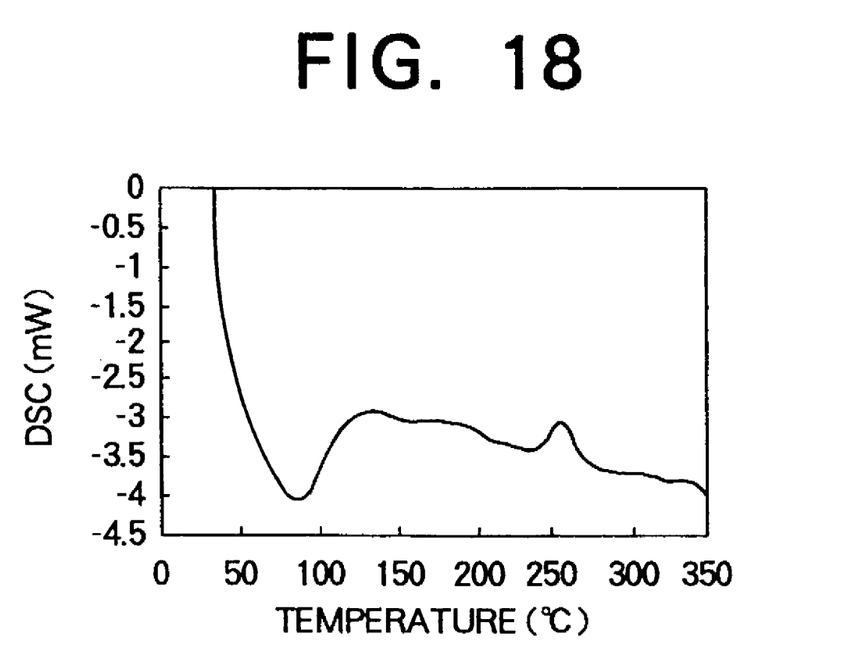
FIG. 18 is a result of differential scanning calorimetry of the oxytitanium phthalocyanine crystal manufactured by the process according to the first comparative example.
Figure 19:
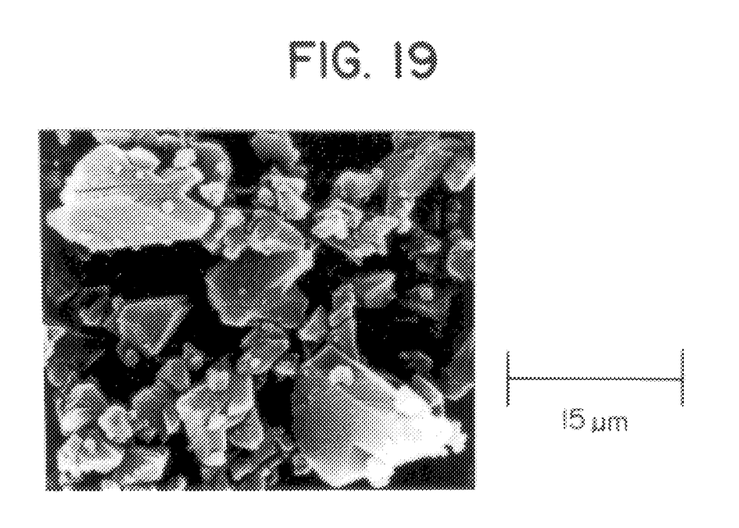
FIG. 19 is a SEM photograph of the oxytitanium phthalocyanine crystal manufactured by the process according to the first comparative example.

Comparative Sample of oxytitanium phthalocyanine crystal was obtained by adding tetrahydrofuran to 2 gram of the blue non-crystal oxytitanium phthalocyanine. The total volume was 200 ml. The oxytitanium phthalocyanine crystal, which was stirred for 30 minutes, kept for a week, taken out as a solid ingredient in the dispersed liquid and dried, exhibited strong peaks at 9.6°, 14.3°, 24.2° and 27.3° and weak and broad peaks at 11.6°, 13.5°, 18.1° in Bragg angle 2θ±0.2° by CuKα characteristic X-ray diffraction. The differential scanning calorimetry for the oxytitanium phthalocyanine crystal showed an exothermic peak of 2.1 J(joule)/g at around 256° C. due to crystal structure transform. A SEM observation for the crystal manifested that a maximum grain size was 1.5 μm. FIGS. 17, 18 and 19 show the results of the CuKα characteristic X-ray diffraction, differential scanning calorimetry and SEM photography, respectively, for the oxytitanium phthalocyanine crystal of Comparative Sample #1.

Table 1 shows measurement in grain size and temperature of crystal structure transform for Samples #1 and #2 and Comparative Sample #1.

TABLE 1

| Sample | Grain size (μm) | Temp. of crystal structure transform (°C.) |
|---|---|---|
| Sample #1 | 0.4 | 266 |
| Sample #2 | 0.4 | 266 |
| Comp. #1 | 1.5 | 256 |

Embodiment 1

A 0.2-μm thick undercoat layer made of methoxymethylated nylon (from Unichika corp., T-8) was formed on an aluminum substrate. 1.68 parts by weight oxytitanium phthalocyanine crystal from Sample #1, 1.12 parts by weight polyvinylbutyral (from Sekisui Chemical corp. BX-1) and 97.2 parts by weight diethyleneglicoldimethylether are admixed and coated onto the undercoat layer, followed by drying at 100° C. for 60 minute to form a 0.2 μm thick charge-generation layer. On the charge-generation layer, dichloroethane solution containing 1,1-bis(4-diethylaminophenyl)-4,4-diphenyl-1,3-butadiene and polycarbonate (from Mitsubishi Gas Chemical corp. Yupilon Z-200) at a ratio of 0.8:1 was coated and dried at 80° C. for 60 minutes to form a 20 μm-thick charge-transfer layer, thereby obtaining a photoreceptor for electrophotography.

Embodiment 2

Another photoreceptor was prepared similarly to Embodiment 1 except for a charge-generation layer, which was formed by admixing 2.1 parts by weight oxytitanium phthalocyanine crystal from Sample #2, 1.4 parts by weight polyvinylbutyral (from Sekisui Chemical corp. BX-1) and 96.5 parts by weight dimethoxytetrahydrofuran and applying the same.

Embodiment 3

Another photoreceptor was prepared similarly to Embodiment 1 except for a charge-transport layer, which was formed by application of a dichloroethane solution containing 1-(4-bis(phenylmethyl)aminophenyl)-1-(4-diethylaminophenyl)-4,4-diphenyl-1,3-butadiene and polycarbonate (from Mitsubishi Gas Chemical Yupilon Z-200) at a ratio of 0.8:1 and applying the same.

Embodiment 4

Another photoreceptor was prepared similarly to Embodiment 3 except for a charge-generation layer, which was formed by admixing 2.1 parts by weight oxytitanium phthalocyanine crystal from Sample #2, 1.4 parts by weight polyvinylbutyral (from Sekisui Chemical corp. BX-1) and 96.5 parts by weight dimethoxytetrahydrofuran, and applying the same.

Embodiment 5

Another photoreceptor was prepared similarly to Embodiment 1 except for a charge-transport layer, which was formed by applying a dichloroethane solution containing benzaldehyde-4-(bis(phenylmethyl)amnino)-2-methyl-diphenylhydrazone and polycarbonate at a ratio of 0.8:1 and applying the same.

Embodiment 6

Another photoreceptor was prepared similarly to Embodiment 5 except for a charge-generation layer, which was formed by admixing 2.1 parts by weight oxytitanium phthalocyanine crystal from Sample #2, 1.4 parts by weight polyvinylbutyral (from Sekisui Chemical corp. BX-1) and 96.5 parts by weight dimethoxytetrahydrofuran, and applying the same.

Embodiment 7

Another photoreceptor was prepared similarly to Embodiment 1 except for a charge-transport layer, which was formed by applying a dichloroethane solution containing benzaldehyde-4-(bis(phenylmethyl)amnino)-2-methyl-diphenylhydrazone and 1,1-bis(4-diethylaminophyenyl)-4,4-diphenyl-1,3-butadiene and polycarbonate at a ratio of 0.4:0.4:1 and applying the same.

Embodiment 8

Another photoreceptor was prepared similarly to Embodiment 7 except for a charge-generation layer, which was formed by admixing 2.1 parts by weight oxytitanium phthalocyanine crystal from Sample #2, 1.4 parts by weight polyvinylbutyral (from Sekisui Chemical corp. BX-1) and 96.5 parts by weight dimethoxytetrahydrofuran, and applying the same.

Embodiment 9

Another photoreceptor was prepared similarly to Embodiment 1 except for a charge-transport layer, which was formed by applying a dichloroethane solution containing benzaldehyde-4-(bis(phenylmethyl)amnino)-2-methyl-diphenylhydrazone and 1-(4bis(phenylmethyl)aminophenyl)-1-(4-diethylaminophyenyl)-4,4-diphenyl-1,3-butadiene and polycarbonate (from Mitsubishi Gas Chemical corp. Yupilon Z-200) at a ratio of 0.4:0.4:1 and applying the same.

Embodiment 10

Another photoreceptor was prepared similarly to Embodiment 9 except for a charge-generation layer, which was formed by admixing 2.1 parts by weight oxytitanium phthalocyanine crystal from Sample #2, 1.4 parts by weight polyvinylbutyral (from Sekisui Chemical corp. BX-1) and 96.5 parts by weight dimethoxytetrahydrofuran, and applying the same.

Embodiment 11

Another photoreceptor was prepared similarly to Embodiment 1 except for a charge-transport layer, which was formed by applying a dichloroethane solution containing benzaldehyde-4-(bis(phenylmethyl)amnino)-2-methyl-diphenylhydrazone, and 1-(4-bis(phenylmethyl)aminophenyl)-1-(4-diethylaminophyenyl)-4,4-diphenyl-1,3-butadiene, and 1,1-bis(4-diethylaminophyenyl)-4,4-diphenyl-1,3-butadiene and polycarbonate (from Mitsyubishi Gas Chemical corp. Yupilon Z-200) at a ratio of 0.3:0.3:0.2:1 and applying the same.

Embodiment 12

Another photoreceptor was prepared similarly to Embodiment 11 except for a charge-generation layer, which was formed by admixing 2.1 parts by weight oxytitanium phthalocyanine crystal from Sample #2, 1.4 parts by weight polyvinylbutyral (from Sekisui Chemical corp. BX-1) and 96.5 parts by weight dimethoxytetrahydrofuran, and applying the same.

Comparative Example 1

Another photoreceptor was prepared similarly to Embodiment 1 except for a charge-generation layer, which was formed by admixing 1.8 parts by weight oxytitanium phthalocyanine crystal from Comparative Sample #1, 1.2 parts by weight polyvinylbutyral (from Sekisui Chemical corp. BX-1) and 97 parts by weight dimethoxytetrahydrofuran, and applying the same.

Comparative Example 2

Another photoreceptor was prepared similarly to Embodiment 3 except for a charge-generation layer, which was formed by admixing 1.8 parts by weight oxytitanium phthalocyanine crystal from Comparative Sample #1, 1.2 parts by weight polyvinylbutyral (from Sekisui Chemical corp.

BX-1) and 97 parts by weight dimethoxytetrahydrofuran, and applying the same.

Comparative Example 3

Another photoreceptor was prepared similarly to Embodiment 5 except for a charge-generation layer, which was formed by admixing 1.8 parts by weight oxytitanium phthalocyanine crystal from Comparative Sample #1, 1.2 parts by weight polyvinylbutyral (from Sekisui Chemical corp. BX-1) and 97 parts by weight dimethoxytetrahydrofuran, and applying the same.

Comparative Example 4

Another photoreceptor was prepared similarly to Embodiment 7 except for a charge-generation layer, which was formed by admixing 1.8 parts by weight oxytitanium phthalocyanine crystal from Comparative Sample #1, 1.2 parts by weight polyvinylbutyral (from Sekisui Chemical corp. BX-1) and 97 parts by weight dimethoxytetrahydrofuran, and applying the same.

Comparative Example 5

Another photoreceptor was prepared similarly to Embodiment 9 except for a charge-generation layer, which was formed by admixing 1.8 parts by weight oxytitanium phthalocyanine crystal from Comparative Sample #1, 1.2 parts by weight polyvinylbutyral (from Sekisui Chemical corp. BX-1) and 97 parts by weight dimethoxytetrahydrofuran, and applying the same.

Comparative Example 6

Another photoreceptor was prepared similarly to Embodiment 11 except for a charge-generation layer, which was formed by admixing 1.8 parts by weight oxytitanium phthalocyanine crystal from Comparative Sample #1, 1.2 parts by weight polyvinylbutyral (from Sekisui Chemical corp. BX-1) and 97 parts by weight dimethoxytetrahydrofuran, and applying the same.

The photoreceptors of Embodiments and Comparative examples as described above are measured for characteristics in electrophotography by using an electrostatic printing tester, wherein the photoreceptors are first charged by a −5 kV corona discharger, followed by subjecting to dark decay for 3 seconds and exposure of white light at 5 lux for 5 seconds. During the exposure, time interval for decay of the surface potential down to a half the initial potential was measured, which is shown in Table 2 as a photosensitivity (lux·second)

TABLE 2

|  | Photosensitivity (lux · sec) | Potential hold rate (%) |
| --- | --- | --- |
| Embod. 1 | 0.28 | 97 |
| Embod. 2 | 0.35 | 94 |
| Embod. 3 | 0.27 | 97 |
| Embod. 4 | 0.33 | 95 |
| Embod. 5 | 0.27 | 97 |
| Embod. 6 | 0.32 | 95 |
| Embod. 7 | 0.27 | 96 |
| Embod. 8 | 0.32 | 94 |
| Embod. 3 | 0.27 | 95 |
| Embod. 10 | 0.33 | 93 |
| Embod. 11 | 0.27 | 97 |
| Embod. 12 | 0.35 | 95 |
| Comp. Ex.1 | 0.24 | 96 |
| Comp. Ex.2 | 0.26 | 95 |
| Comp. Ex.3 | 0.27 | 96 |
| Comp. Ex.4 | 0.26 | 93 |
| Comp. Ex.5 | 0.26 | 93 |
| Comp. Ex.6 | 0.27 | 96 |

What is claimed is:

1. An oxytitanium phthalocyanine crystal having strong peaks at approximately 9.6°, 24.2° and 27.3° and weak and broad peaks at approximately 11.6°, 13.5°, 14.3° and 18.1° in Bragg angle 2θ±0.2° by CuKα characteristic X-ray diffraction, and an exothermic peak at approximately 266° C. in differential scanning calorimetry.

2. An oxytitanium phthalocyanine crystal as defined in claim 1 having a maximum grain size at approximately 0.4 μm.

3. A method for manufacturing an oxytitanium phthalocyanine crystal according to claim 1, comprising the step of stirring non-crystal grains of oxytitanium phthalocyanine in a triether or polyether organic solvent to grow said crystal.

4. A method for manufacturing an oxytitanium phthalocyanine crystal as defined in claim 3 wherein the weight ratio of triether organic solvent to oxytitanium phthalocyanine is between 10:1 and 200:1.

5. A photoreceptor for electrophotography containing an effective amount of the oxytitanium phthalocyanine crystal as defined in claim 1.

6. The method according to claim 3, wherein stirring is in a triether organic solvent.

7. The method according to claim 3, wherein stirring is in a polyether organic solvent.

* * * * *

UNITED STATES PATENT AND TRADEMARK OFFICE
CERTIFICATE OF CORRECTION

PATENT NO. : 5,831,084
DATED : November 3, 1998
INVENTOR(S) : Satoru TOGUCHI and Akira HIRANO It is certified that error appears in the above-identified patent and that said Letters Patent is hereby corrected as shown below:

Column 6, line 16, delete "0 µm" and insert --50 µm--.

Column 8, line 4, delete "litter" and insert --liter--.

Column 2, Table 12, between Embod. 8 and Embod. 10, delete "Embod. 3" and insert --Embod. 9--.

Signed and Sealed this

Eighth Day of June, 1999

Q. TODD DICKINSON

Attest:

Attesting Officer

Acting Commissioner of Patents and Trademarks